United States Patent
Yan

(10) Patent No.: US 11,761,788 B2
(45) Date of Patent: Sep. 19, 2023

(54) METHOD AND APPARATUS FOR GENERATING OFFLINE MAP, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventor: Yongshan Yan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 272 days.

(21) Appl. No.: 17/221,249

(22) Filed: Apr. 2, 2021

(65) Prior Publication Data
US 2021/0223062 A1 Jul. 22, 2021

(30) Foreign Application Priority Data
Jun. 5, 2020 (CN) .......................... 202010506742.7

(51) Int. Cl.
*G01C 21/00* (2006.01)
*G06T 7/73* (2017.01)
(Continued)

(52) U.S. Cl.
CPC ....... *G01C 21/3837* (2020.08); *B60W 60/001* (2020.02); *G05D 1/0274* (2013.01);
(Continued)

(58) Field of Classification Search
CPC ............ G01C 21/3837; B60W 60/001; B60W 2420/42; G05D 1/0274; G05D 2201/0213;
(Continued)

(56) References Cited

U.S. PATENT DOCUMENTS 7,352,386 B1 * 4/2008 Shum ...................... G06T 17/00
348/42
11,274,929 B1 * 3/2022 Afrouzi ..................... G06T 7/55
(Continued)

FOREIGN PATENT DOCUMENTS

CN 109087359 A 12/2018
CN 109920055 A 6/2019
(Continued)

OTHER PUBLICATIONS

Office Action for Chinese Application No. 202010506742.7, dated Oct. 21, 2021, 6 pages.
Extended European Search Report for Application No. 21164536.1, dated Sep. 17, 2021, 11 pages.
George Klein et al., "Parallel Tracking and Mapping for Small AR Workspaces", Nov. 13, 2007, (Printed off of the Internet), 10 pages.

*Primary Examiner* — Hunter B Lonsberry
*Assistant Examiner* — Harrison Heflin
(74) *Attorney, Agent, or Firm* — Lippes Mathias LLP

(57) ABSTRACT

A method and an apparatus for generating an offline map are disclosed. The method includes: obtaining $1^{st}$ to $n^{th}$ environmental images sequentially collected by a camera of a vehicle when the vehicle is traveling on a target road section; selecting $i^{th}$ to $j^{th}$ environmental images from the $1^{st}$ to $N^{th}$ environmental images, performing a first batch of three-dimensional modeling on the $i^{th}$ to $j^{th}$ environmental images to obtain first posture information of the camera and a first world coordinate; performing a second batch of three-dimensional modeling in parallel on the $1^{st}$ to $(i-1)^{th}$ environmental images and $(j+1)^{th}$ to $N^{th}$ environmental images, based on the first posture information and the first world coordinate, to obtain a second world coordinate and to obtain a third world coordinate; and generating an offline map of the target road section according to the world coordinate.

18 Claims, 8 Drawing Sheets

(51) Int. Cl.
*B60W 60/00* (2020.01)
*G05D 1/02* (2020.01)
*G06T 17/00* (2006.01)

(52) U.S. Cl.
CPC ............... *G06T 7/75* (2017.01); *G06T 17/00* (2013.01); *B60W 2420/42* (2013.01); *G05D 2201/0213* (2013.01); *G06T 2207/30244* (2013.01); *G06T 2207/30252* (2013.01)

(58) Field of Classification Search
CPC . G06T 7/75; G06T 17/00; G06T 2207/30244; G06T 2207/30252
See application file for complete search history.

(56) References Cited

U.S. PATENT DOCUMENTS

| | | | |
|---|---|---|---|
| 2019/0050992 A1 | 2/2019 | Xu et al. | |
| 2019/0130641 A1* | 5/2019 | Barajas Hernandez | ..................... G06T 17/05 |
| 2022/0185271 A1* | 6/2022 | Cheng | .................. G05D 1/0278 |
| 2022/0232169 A1* | 7/2022 | Araújo | ................. H04N 23/675 |

FOREIGN PATENT DOCUMENTS

| | | |
|---|---|---|
| CN | 110715671 A | 1/2020 |
| CN | 111174799 A | 5/2020 |

* cited by examiner

METHOD AND APPARATUS FOR GENERATING OFFLINE MAP, ELECTRONIC DEVICE AND STORAGE MEDIUM

CROSS-REFERENCE TO RELATED APPLICATION

The present application is based upon and claims priority to Chinese Patent Application No. 202010506742.7, filed on Jun. 5, 2020, the entire contents of which are incorporated herein by reference.

TECHNICAL FIELD

The present disclosure relates to a computer technical field, and in particular to, a field of autonomous driving and parking technologies.

BACKGROUND

In a vehicle driving process, autonomous driving and parking is realized by controlling the vehicle to drive according to an offline map, so as to effectively reduce the incidence of traffic accidents and to significantly reduce air pollution due to such as exhaust emission. Therefore, how to improve the speed of generating an offline map while ensuring accuracy of the offline map has become one of the important research directions.

SUMMARY

In a first aspect, embodiments of the disclosure provide a method for generating an offline map. The method includes: obtaining a first environmental image to an $N^{th}$ environmental image sequentially collected by a camera of a vehicle when the vehicle is traveling on a target road section, in which N is a positive integer; selecting an $i^{th}$ environmental image to a $j^{th}$ environmental image from the first environmental image to the $N^{th}$ environmental image, in which i is a positive integer greater than 1 and less than j, and j is a positive integer less than N; performing a first batch of three-dimensional modeling on the $i^{th}$ environmental image to the $j^{th}$ environmental image to obtain first posture information of the camera and a first world coordinate corresponding to a first test point in the $i^{th}$ environmental image to the $j^{th}$ environmental image; performing a second batch of three-dimensional modeling in parallel on the first environmental image to an $(i-1)^{th}$ environmental image and a $(j+1)^{th}$ environmental image to the $N^{th}$ environmental image, based on the first posture information and the first world coordinate corresponding to the first test point, to obtain a second world coordinate corresponding to a second test point in the first environmental image to the $(i-1)^{th}$ environmental image, and a third world coordinate corresponding to a third test point in the $(j+1)^{th}$ environmental image to the $N^{th}$ environmental image; and generating an offline map of the target road section according to the first world coordinate, the second world coordinate, and the third world coordinate.

In a second aspect, embodiments of the disclosure provide an apparatus for generating an offline map. The apparatus includes at least one processor and a memory communicatively connected with the at least one processor. The at least one processor is configured to obtain a first environmental image to an $N^{th}$ environmental image sequentially collected by a camera of a vehicle when the vehicle is traveling on a target road section, in which N is a positive integer; select an $i^{th}$ environmental image to a $j^{th}$ environmental image from the first environmental image to the $N^{th}$ environmental image, in which i is a positive integer greater than 1 and less than j, and j is a positive integer less than N; perform a first batch of three-dimensional modeling on the $i^{th}$ environmental image to the $j^{th}$ environmental image to obtain first posture information of the camera and a first world coordinate corresponding to a first test point in the $i^{th}$ environmental image to the $j^{th}$ environmental image; perform a second batch of three-dimensional modeling in parallel on the first environmental image to an $(i-1)^{th}$ environmental image and a $(j+1)^{th}$ environmental image to the $N^{th}$ environmental image, based on the first posture information and the first world coordinate corresponding to the first test point, to obtain a second world coordinate corresponding to a second test point in the first environmental image to the $(i-1)^{th}$ environmental image, and a third world coordinate corresponding to a third test point in the $(j+1)^{th}$ environmental image to the $N^{th}$ environmental image; and generate an offline map of the target road section according to the first world coordinate, the second world coordinate, and the third world coordinate.

In a third aspect, embodiments of the disclosure provide a vehicle comprising a camera and a processor. The camera may be configured to collect a first environmental image to an $N^{th}$ environmental image sequentially when the vehicle is traveling on a target road section, where N is a positive integer. The processor may be configured to obtain the first environmental image to the $N^{th}$ environmental image; select an $i^{th}$ environmental image to a $j^{th}$ environmental image from the first environmental image to the $N^{th}$ environmental image, where i is a positive integer greater than 1 and less than j, and j is a positive integer less than N; perform a first batch of three-dimensional modeling on the $i^{th}$ environmental image to the $j^{th}$ environmental image to obtain first posture information of the camera and a first world coordinate corresponding to a first test point in the $i^{th}$ environmental image to the $j^{th}$ environmental image; perform a second batch of three-dimensional modeling in parallel on the first environmental image to an $(i-1)^{th}$ environmental image and a $(j+1)^{th}$ environmental image to the $N^{th}$ environmental image, based on the first posture information and the first world coordinate corresponding to the first test point, to obtain a second world coordinate corresponding to a second test point in the first environmental image to the $(i-1)^{th}$ environmental image, and a third world coordinate corresponding to a third test point in the $(j+1)^{th}$ environmental image to the $N^{th}$ environmental image; and generate an offline map of the target road section according to the first world coordinate, the second world coordinate, and the third world coordinate.

It should be understood that the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

A method for generating an offline map, an apparatus for generating an offline map, an electronic device, and a storage medium according to the embodiments of the present disclosure are described below with reference to the accompanying drawings.

Figure 1:
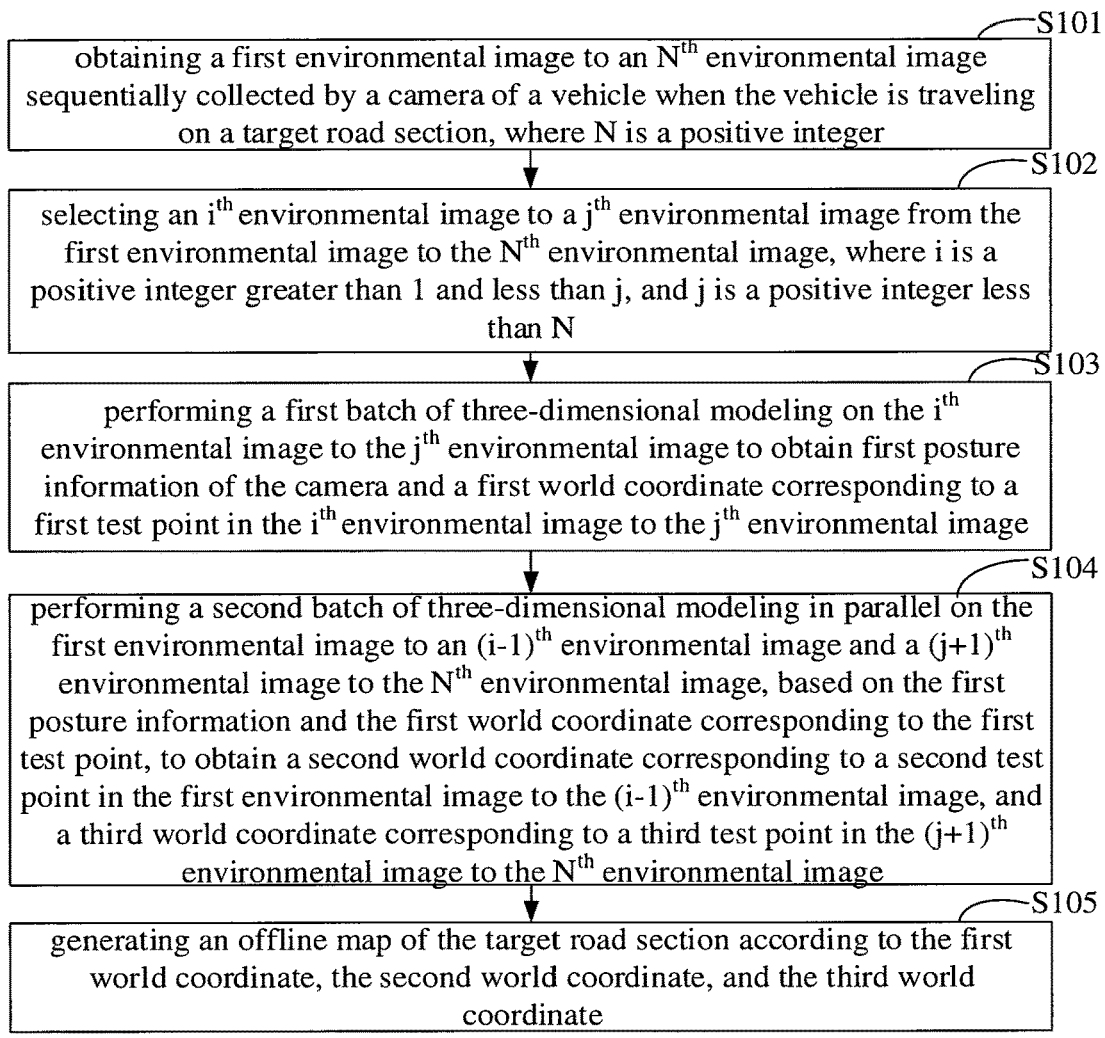
FIG. 1 is a schematic diagram according to Embodiment 1 of the present disclosure.

FIG. 1 is a schematic diagram according to Embodiment 1 of the present disclosure. It should be noted that an execution subject of the method for generating an offline map in this embodiment is an apparatus for generating an offline map, which may specifically be a hardware device, or software in a hardware device. The hardware device may be a terminal device or a server, etc. As illustrated in FIG. 1, the method for generating the offline map according to this embodiment includes the following blocks S101-S105.

At block S101, a first environmental image to an $N^{th}$ environmental image sequentially collected by a camera of a vehicle are obtained when the vehicle is traveling on a target road section, in which N is a positive integer.

In the embodiments of the present disclosure, it is possible to obtain the environmental images collected by the camera of the vehicle when the vehicle is traveling on any one of the predetermined target road sections.

The target road section may be any road section that needs to be observed. For example, the road section that the user pays attention to may be used as the target road section. For another example, the road section that the user frequently reciprocates in daily life may be used as the target road section.

The number of environmental images that are tried to obtain and are uploaded by the camera may be set according to actual conditions. For example, it is possible to obtain 60 environmental images sequentially collected by the camera when the vehicle is traveling on the target road section, that is, N may be set to 60.

For example, if the target road section is a road section between an entrance of a cell where the user lives and a fixed parking space of the user in an underground parking lot, the first image to the $60^{th}$ image sequentially collected by the camera of the vehicle (60 images in total) are obtained when the vehicle is traveling on the target road section. If the target road section is a road section between two exits on an expressway, the first image to the $30^{th}$ image sequentially collected by the camera of the vehicle (30 images in total) are obtained when the vehicle is traveling on the target road section.

It should be noted that the camera of the vehicle collects environmental images at preset intervals and communicates with the vehicle to upload the environmental images collected sequentially. The preset interval may be a preset distance interval or a preset time interval. For example, the preset interval may be set to 17 meters or 20 meters. The preset interval may also be set to 10 seconds or 15 seconds.

The location where the camera is installed on the vehicle and the way in which the camera takes images are not limited in this disclosure, which are selected according to actual conditions. For example, a plurality of cameras may be set at the front and rear of the vehicle, and according to the driving direction (forward or reverse) of the vehicle, a matching camera is selected for obtaining the environmental images. If the driving direction of the vehicle is reverse, the camera set at the rear of the vehicle is used for shooting. If the driving direction of the vehicle is forward, the camera set at the front of the vehicle is used for shooting. The driving direction of the vehicle is determined according to a gear position of the vehicle. For example, if the vehicle gear is D, the driving direction is determined to be forward, and if the vehicle gear is R, the driving direction is then determined to be reverse. For another example, the vehicle may provide a camera being able to take images both at the front of the vehicle and at the rear of the vehicle, and the shooting direction of the camera may be determined according to the driving direction of the vehicle.

At block S102, an $i^{th}$ environmental image to a $j^{th}$ environmental image are selected from the first environmental image to the $N^{th}$ environmental image, in which i is a positive integer greater than 1 and less than j, and j is a positive integer less than N.

It should be noted that when trying to select a segment of environmental images from the $1^{st}$ to $N^{th}$ environmental images, the environmental images in the middle segment may be selected, and the environmental images other than the $i^{th}$ to $j^{th}$ environmental images may be equally divided into two segments, so that the time consumption of three-dimensional modeling is minimized when the second batch of three-dimensional modeling is carried out. For example, the $26^{th}$ to $35^{th}$ environmental images are selected from the $1^{st}$ to $60^{th}$ environmental images.

It should be noted that the method for selecting environmental images is only an example of a specific selection method. In practical applications, any segment of environmental images from the $1^{st}$ to $N^{th}$ environmental images may be selected according to actual conditions. For example, the $20^{th}$ to $40^{th}$ environmental images are selected from the $1^{st}$ to $60^{th}$ environmental images.

At block S103, a first batch of three-dimensional modeling is performed on the $i^{th}$ environmental image to the $j^{th}$ environmental image to obtain first posture information of the camera and a first world coordinate corresponding to a first test point in the $i^{th}$ environmental image to the $j^{th}$ environmental image.

The posture information of the camera is a three-dimensional coordinate and a rotation angle of the camera in a world coordinate system, and the first posture information of the camera is a three-dimensional coordinate and a rotation angle of the camera located in the world coordinate system obtained by performing three-dimensional modeling on the $i^{th}$ to $j^{th}$ environmental images.

The world coordinate of the test point is a three-dimensional coordinate of the test point in the world coordinate system, and the first world coordinate corresponding to the first test point is a three-dimensional coordinate corresponding to the test point in the $i^{th}$ to $j^{th}$ environmental images located in the world coordinate system. The test points are representative feature points that exist in parallel in two adjacent environmental images, such as vertices of a building.

For example, after the $26^{th}$ to $35^{th}$ environmental images are selected from the $1^{st}$ to $60^{th}$ environmental images. The first batch of three-dimensional modeling is performed on the $26^{th}$ to $35^{th}$ environmental images to obtain 9 pieces of first posture information of the camera and 9 groups of first world coordinate of the first test point.

In the embodiments of the present disclosure, when trying to perform the first batch of three-dimensional modeling, a structure from motion (SFM) algorithm may be used to estimate a three-dimensional structure from the sequentially collected $i^{th}$ to $j^{th}$ environmental images (i.e., a two-dimensional image sequence) so as to realize the first batch of three-dimensional modeling. The specific calculation method of the SFM algorithm is in the related art, which is not repeated here.

At block S104, a second batch of three-dimensional modeling is performed in parallel on the first environmental image to an $(i-1)^{th}$ environmental image and from a $(j+1)^{th}$ environmental image to the $N^{th}$ environmental image, based on the first posture information and the first world coordinate corresponding to the first test point, to obtain a second world coordinate corresponding to a second test point in the first environmental image to the $(i-1)^{th}$ environmental image, and a third world coordinate corresponding to a third test point in the $(j+1)^{th}$ environmental image to the $N^{th}$ environmental image.

The second world coordinate corresponding to the second test point is a three-dimensional coordinate of the test point from the $1^{st}$ to $(i-1)^{th}$ environmental images located in the world coordinate system and the third world coordinate corresponding to the third test point is the three-dimensional coordinate of the test point from the $(j+1)^{th}$ to $N^{th}$ environmental images located in the world coordinate system.

Optionally, after the first posture information and the first world coordinate are obtained through the first batch of three-dimensional modeling, the second batch of three-dimensional modeling is performed in parallel on the $1^{st}$ to $(i-1)^{th}$ environmental images and the $(j+1)^{th}$ to $N^{th}$ environmental images, based on the first posture information and the first world coordinate corresponding to the first test point.

For example, based on the 9 pieces of first posture information and the 9 groups of first world coordinate obtained by performing the first batch of three-dimensional modeling on the $26^{th}$ to $35^{th}$ environmental images, the second batch of three-dimensional modeling is performed on the $1^{st}$ to the $25^{th}$ environmental images, to obtain 25 groups of second world coordinate corresponding to second test point in the $1^{st}$ to the $25^{th}$ environmental images. Meanwhile, the second batch of three-dimensional modeling is performed on the $36^{th}$ to $60^{th}$ environmental images to obtain 25 groups of third world coordinate corresponding to the third test point in the $36^{th}$ to $60^{th}$ environmental images.

In the embodiments of the present disclosure, when trying to perform the second batch of three-dimensional modeling, the SFM algorithm may be used to estimate a three-dimensional structure from the sequentially collected $1^{st}$ to $(i-1)^{th}$ environmental images and the $(j+1)^{th}$ to $N^{th}$ environmental images (a two-dimensional image sequence) so as to realize the second batch of three-dimensional modeling. The specific calculation method of the SFM algorithm is in the related art, which is not repeated here.

At block S105, an offline map of the target road section is generated according to the first world coordinate, the second world coordinate, and the third world coordinate.

The offline map includes but is not limited to the following information: a driving route, a highway classification, a number of lanes, a turning radius, a slope, a speed limit and a traffic signal.

It should be noted that the method for generating the offline map is not limited in this disclosure. In actual applications, the method is selected according to the situation. For example, after obtaining the first world coordinate, the second world coordinate and the third world coordinate, three-dimensional reconstruction is performed on the target road section to obtain a three-dimensional image of the target road section. Furthermore, the three-dimensional image of the target road section is transplanted to a corresponding position in the satellite map or the existing three-dimensional map, so as to generate an offline map of the target road section.

According to the method for generating an offline map of the embodiments of the present disclosure, the environmental images sequentially collected may be obtained when the vehicle is traveling on the target road section, and a segment of environmental images extracted from the collected environmental images to perform the first batch of three-dimensional modeling and obtain the first posture information of the camera and the first world coordinate corresponding to the first test point. Then the remaining environmental images are divided into two segments (the front and rear segments), and the second batch of three-dimensional modeling is performed on the two segments of environmental images in parallel to obtain the second world coordinate corresponding to the second test point and the third world coordinate corresponding to the third test point. The offline map is generated based on the obtained world coordinates, which ensures the accuracy of two batches of three-dimensional modeling and shortens the time-consuming process of three-dimensional modeling. The offline map ready to learn and use may be generated without obtaining the offline map from other platforms in advance, thereby ensuring autonomous driving, especially effectiveness and safety of autonomous driving and parking.

It should be noted that in this disclosure, in order to improve the speed of three-dimensional modeling while ensuring the accuracy of three-dimensional modeling, the environmental images in a middle segment are extracted from the collected environmental images, and an initial image pair is selected as an initial point from the middle section of the environmental images, and the first batch of three-dimensional modeling is performed.

Figure 2:
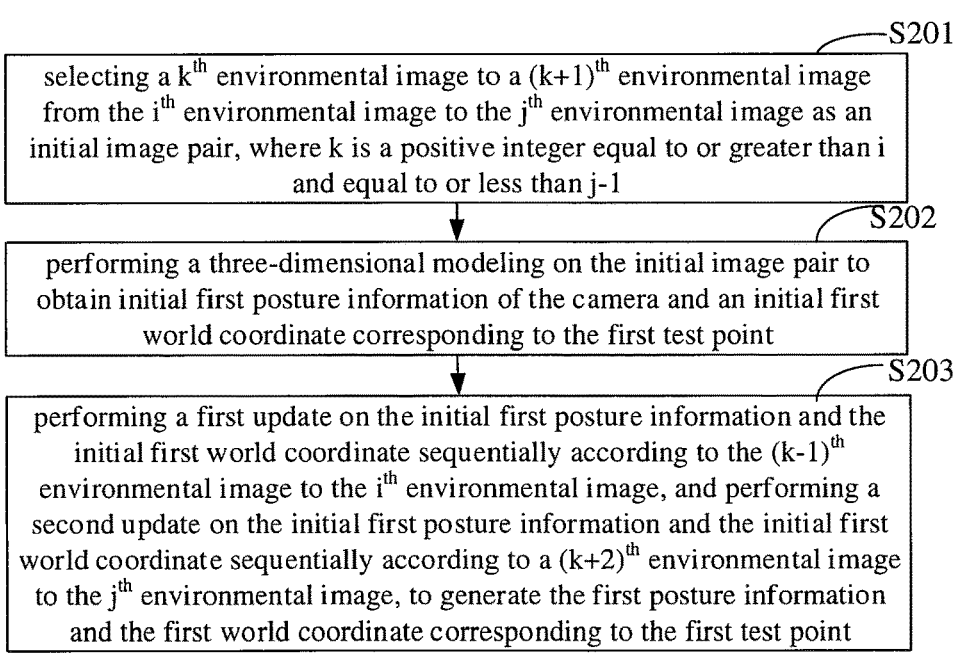
FIG. 2 is a schematic diagram according to Embodiment 2 of the present disclosure.

As a possible implementation, as illustrated in FIG. 2, on the basis of the above embodiments, the process of performing the first batch of three-dimensional modeling on the $i^{th}$ environmental image to the $j^{th}$ environmental image at block S103, specifically includes the following blocks S201-S203.

At block S201, a $k^{th}$ environmental image to a $(k+1)^{th}$ environmental image are selected from the $i^{th}$ environmental image to the $j^{th}$ environmental image as an initial image pair, in which k is a positive integer equal to or greater than i and equal to or less than j−1.

Optionally, the $k^{th}$ to $(k+1)^{th}$ environmental images may be selected as the initial image pair according to a parallactic angle between any adjacent two environmental images and/or a number of the first test point from the $i^{th}$ to $j^{th}$ environmental images, after selecting the $i^{th}$ to $j^{th}$ environmental images from the $1^{st}$ to $N^{th}$ environmental images.

For example, after the $26^{th}$ to $35^{th}$ environmental images are selected from the $1^{st}$ to $60^{th}$ environmental images, the $30^{th}$ to $31^{th}$ environmental images are selected as the initial picture pair.

At block S202, a first batch of three-dimensional modeling is performed on the initial image pair to obtain initial first posture information of the camera and an initial first world coordinate corresponding to the first test point.

For example, the $30^{th}$ to $31^{th}$ environmental images are taken as the initial point, and a three-dimensional modeling is performed to obtain a $1^{st}$ piece of first posture information (i.e., the initial first posture information) of the camera and a $1^{st}$ group of first world coordinate (i.e., the initial first world coordinate) corresponding to the first test point.

At block S203, a first update is performed on the initial first posture information and the initial first world coordinate sequentially according to the $(k−1)^{th}$ environmental image to the $i^{th}$ environmental image, and a second update is performed on the initial first posture information and the initial first world coordinate sequentially according to a $(k+2)^{th}$ environmental image to the $j^{th}$ environmental image, to generate the first posture information and the first world coordinate corresponding to the first test point.

For example, the first update may be performed on the initial first posture information and the initial first world coordinate respectively according to the $29^{th}$ to $26^{th}$ environmental images, and the second update is performed on the initial first posture information and the initial first world coordinate respectively according to the $32^{th}$ to $35^{th}$ environmental images, to generate 9 pieces of first posture information and 9 groups of first world coordinate corresponding to the first test point.

Figure 3:
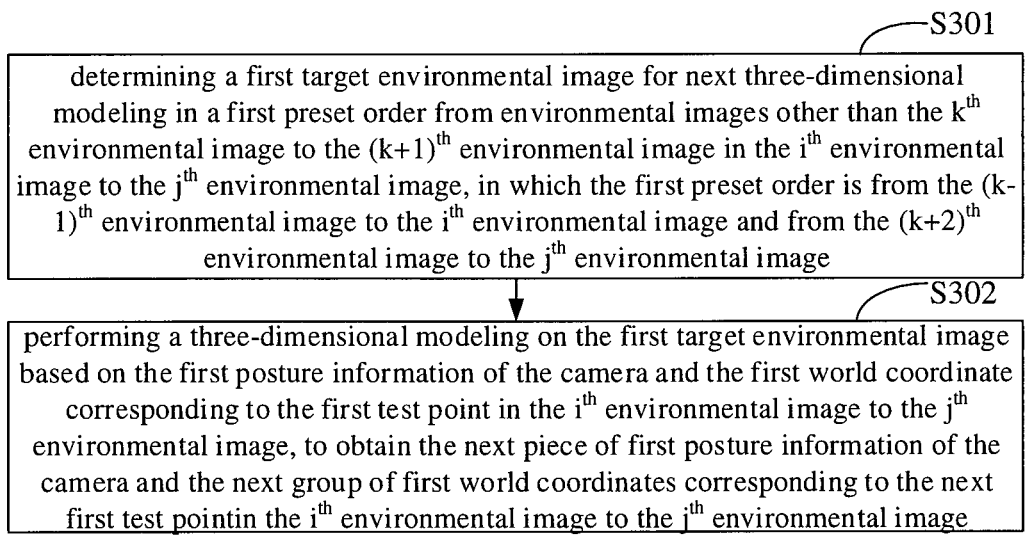
FIG. 3 is a schematic diagram according to Embodiment 3 of the present disclosure.

It should be noted that, after performing the three-dimensional modeling on the initial image pair to obtain the initial first pose information and the initial first world coordinate corresponding to the first test point, it is possible to take the initial image pair as a center to divide the remaining environmental images in the middle segment into two segments (i.e., the front segment and the rear segment), and the first update and the second update are performed at the same time (that is, in parallel) or sequentially (that is, in serial) on the initial first posture information and the initial first world coordinate, to generate the first posture information and the first world coordinate corresponding to the first test point. As a possible implementation, as illustrated in FIG. 3, the above update process of performing the first update and the second update in serial on the remaining environmental images in the middle-segment specifically includes the following blocks S301-S302.

At block S301, a first target environmental image for next three-dimensional modeling is determined in a first preset order from environmental images other than the $k^{th}$ environmental image to the $(k+1)^{th}$ environmental image in the $i^{th}$ environmental image to the $j^{th}$ environmental image, in which the first preset order is from the $(k−1)^{th}$ environmental image to the $i^{th}$ environmental image and from the $(k+2)^{th}$ environmental image to the $j^{th}$ environmental image.

For example, after selecting the $26^{th}$ to $35^{th}$ environmental images from the $1^{st}$ to $60^{th}$ environmental images, and selecting the $30^{th}$ to $31^{th}$ environmental images as the initial image pair, the first target environment image for the next three-dimensional modeling may be determined in an order from the $29^{th}$ to $26^{th}$ environmental images and from the $32^{th}$ to $35^{th}$ environmental images, that is, the first target environmental images for the next three-dimensional modeling may be in the order of the $29^{th}$ environmental image, the $28^{th}$ environmental image, and the $27^{th}$ environmental image, the $26^{th}$ environmental image, the $32^{th}$ environmental image, the $33^{th}$ environmental image, the $34^{th}$ environmental image and the $35^{th}$ environmental image.

At block S302, a three-dimensional modeling is performed on the first target environmental image based on the first posture information of the camera and the first world coordinate corresponding to the first test point in the $i^{th}$ to $j^{th}$ environmental images, to obtain the next piece of first posture information of the camera and the next group of first world coordinate corresponding to the first test point in the $i^{th}$ to $j^{th}$ environmental images.

It should be noted that, after the initial image pair is obtained, the $i^{th}$ to $j^{th}$ environmental images are segmented, for example, the $(k−1)^{th}$ to $i^{th}$ environmental images are used as a first segment of environmental images, and the $(k+2)^{th}$ to $j^{th}$ environmental images are used as a second segment of environmental images. The following is an explanation for the first segment of environmental images and the second segment of environmental images.

For the first segment of environmental images, optionally, based on the $1^{st}$ piece of first posture information of the camera and the $1^{st}$ group of first world coordinate of the first test point, a three-dimensional modeling is performed on the $(k−1)^{th}$ environmental image in the $i^{th}$ to $j^{th}$ environmental images, to obtain a $2^{nd}$ piece of first posture information of the camera and a $2^{nd}$ group of first world coordinate of the first test point in the $i^{th}$ to $j^{th}$ environmental images.

For example, based on the $1^{st}$ piece of first posture information of the camera and the $1^{st}$ group of first world coordinate corresponding to the first test point, the three-dimensional modeling is performed on the $29^{th}$ environmental image in the $26^{th}$ to $35^{th}$ environmental images to obtain the $2^{nd}$ piece of first posture information of the camera and the $2^{nd}$ group of first world coordinate corresponding to the first test point in the $26^{th}$ to $35^{th}$ environmental images.

Further, based on the $1^{st}$ to $2^{nd}$ pieces of first posture information of the camera and the $1^{st}$ to $2^{nd}$ groups of the first world coordinate corresponding to the first test point, a three-dimensional modeling is performed on the $(k−2)^{th}$ environmental image in the $i^{th}$ to $j^{th}$ environmental images to obtain a $3^{rd}$ piece of the first posture information of the camera and a $3^{rd}$ group of first world coordinate corresponding to the first test point in the $i^{th}$ to $j^{th}$ environmental images. The process is continued until the three-dimensional modeling is performed on the $i^{th}$ environmental image in the $i^{th}$ to $j^{th}$ environmental images to obtain a $(k−i+1)^{th}$ piece of first posture information of the camera and a $(k-i+1)^{th}$ group of first world coordinate corresponding to the first test point in the $i^{th}$ to $j^{th}$ environmental images.

For example, based on the $1^{st}$ to $2^{nd}$ pieces of first posture information of the camera and the $1^{st}$ to $2^{nd}$ groups of first world coordinate corresponding to the first test point, the three-dimensional modeling is performed on the $28^{th}$ environmental image in the $26^{th}$ to $35^{th}$ environmental images to obtain a $3^{rd}$ piece of first posture information of the camera and a $3^{rd}$ group of first world coordinate corresponding to the first test point in the $26^{th}$ to $35^{th}$ environmental images. The process is continued until the three-dimensional modeling is performed on the $26^{th}$ environmental image in the $26^{th}$ to $35^{th}$ environmental images to obtain a $5^{th}$ piece of first posture information of the camera and a $5^{th}$ group of first world coordinate corresponding to the first test point in the $26^{th}$ to $35^{th}$ environmental images.

Thus, after the initial first posture information of the camera and the initial first world coordinate of the first test point are obtained, the first update of the initial first posture information and the initial first world coordinate is completed sequentially for the first segment of environmental images.

For the second segment of environmental images, optionally, based on the $1^{st}$ to $(k-i+1)^{th}$ pieces of first posture information of the camera and the $1^{st}$ to $(k-i+1)^{th}$ groups of first world coordinate corresponding to the first test point, a three-dimensional modeling is performed on the $(k+2)^{th}$ environmental image in the $i^{th}$ to $j^{th}$ environmental images to obtain a $(k-i+2)^{th}$ piece of first posture information of the camera and a $(k-i+2)^{th}$ group of first world coordinate corresponding to the first test point in the $i^{th}$ to $j^{th}$ environmental images.

For example, based on the $1^{st}$ to $5^{th}$ pieces of first posture information of the camera and the $1^{st}$ to $5^{th}$ group of first world coordinate corresponding to the first test point, a three-dimensional modeling is performed on the $32^{th}$ environmental image in the $26^{th}$ to $35^{th}$ environmental images to obtain a $6^{th}$ piece of first posture information of the camera and a $6^{th}$ group of first world coordinate corresponding to the first test point in the $26^{th}$ to $35^{th}$ environmental images.

Further, based on the $1^{st}$ to $(k-i+2)^{th}$ pieces of first posture information of cameras and the $1^{st}$ to $(k-i+2)^{th}$ groups of first world coordinate corresponding to the first test point, a three-dimensional modeling is performed on the $(k+3)^{th}$ environmental image in the $i^{th}$ to $j^{th}$ environmental images to obtain a $(k-i+3)^{th}$ piece of first posture information of the camera and a $(k-i+3)^{th}$ group of first world coordinate corresponding to the first test point in the $i^{th}$ to $j^{th}$ environmental images. The process is continued until the three-dimensional modeling is performed on the $j^{th}$ environmental image in the $i^{th}$ to $j^{th}$ environmental images to obtain a $(j-i)^{th}$ piece of first posture information of the camera and a $(j-i)^{th}$ group of first world coordinate corresponding to the first test point in the $i^{th}$ to $j^{th}$ environmental images.

For example, based on the $1^{st}$ to $6^{th}$ pieces of first posture information of the cameras and the $1^{st}$ to $6^{th}$ groups of first world coordinate corresponding to the first test point, a three-dimensional modeling is performed on the $33^{th}$ environmental image in the $26^{th}$ to $35^{th}$ environmental images to obtain a $7^{th}$ piece of first posture information of the camera and a $7^{th}$ group of first world coordinate corresponding to the first test point in the $26^{th}$ to $35^{th}$ environmental images. The process is continued until the three-dimensional modeling is performed on the $35^{th}$ environmental image in the $26^{th}$ to $35^{th}$ environmental images to obtain a $9^{th}$ piece of first posture information of the camera and a $9^{th}$ group of first world coordinate corresponding to the first test point in the $26^{th}$ to $35^{th}$ environmental images.

Thus, after the initial first posture information of the camera and the initial first world coordinate corresponding to the first test point are obtained, the second update of the initial first posture information and the initial first world coordinate are completed sequentially for the second segment of environmental images.

Figure 4:
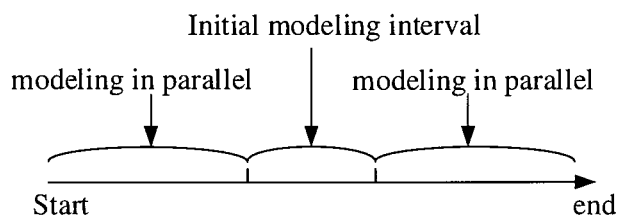
FIG. 4 is a schematic diagram of a three-dimensional modeling process.

It should be noted that when trying to perform the second update on the initial first posture information and the initial first world coordinate, the update may be performed in serial as described above. In other words, after the first update is completed, the second update may be performed based on the $1^{st}$ to $(k-i+1)^{th}$ pieces of first posture information of the cameras and the $1^{st}$ to $(k-i+1)^{th}$ groups of first world coordinate corresponding to the first test point. In this disclosure, in order to further improve the three-dimensional modeling speed, as illustrated in FIG. 4, the first update and the second update may also be performed in parallel, that is, the second update is performed at the same time as the first update.

For example, while the first update is performed on the initial first posture information and the initial first world coordinate according to the $29^{th}$ environmental image, the second update is performed on the initial first posture information and the initial first world coordinate according to the $32^{th}$ environmental image. Further, the first update is performed on the $28^{th}$ environmental image while the second update is performed on the $33^{th}$ environmental image, until that the first update performed on the $26^{th}$ environmental image is completed while the second update is performed on the $35^{th}$ environmental image.

According to the method for generating the offline map in the embodiments of the present disclosure, the first batch of three-dimensional modeling is performed by extracting the middle-segment of environment images from the collected environment images and selecting the initial image pair from the middle-segment of environment images as the initial point, so as to obtain the initial first posture information and the initial first world coordinate. Further, by taking the initial image pair as the center, the remaining environmental images in the middle-segment are divided into two segments, that is, the front and rear segments, and the first update and the second update are performed on the initial first posture information and the initial first world coordinate respectively for the two segments, to obtain the first posture information and the first world coordinate corresponding to the first test point. In this way, the initial first posture information and the initial first world coordinate may be continuously optimized. The initial first posture information, the initial first world coordinate, and the results after multiple optimizations are taken as the first posture information and the first world coordinate corresponding to the first test point, thereby improving the accuracy of the first batch of three-dimensional modeling. Furthermore, the first update and the second update are performed in serial or in parallel, which shortens the time consumption for the first batch of three-dimensional modeling and further shortens the total time consumption of the two batches of three-dimensional modeling.

It should be noted that after the first posture information and the first world coordinate corresponding to the first test point are obtained according to the middle segment of environmental images, the second batch of three-dimensional modeling is performed on the divided two segments (the front and rear segments) of environmental images in parallel to obtain the second world coordinate corresponding to the second test point and the third world coordinate corresponding to the third test point.

Figure 5:
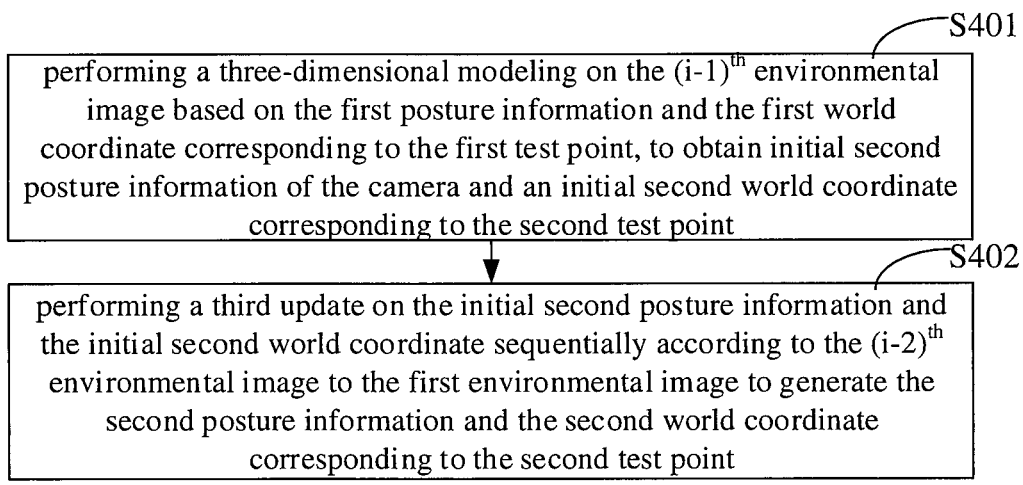
FIG. 5 is a schematic diagram according to Embodiment 4 of the present disclosure.

Regarding the divided front segment of environmental images, as a possible implementation, as illustrated in FIG. 5, on the basis of the above embodiments, before performing the second batch of three-dimensional modeling in parallel on the first to the $(i-1)^{th}$ environmental image and the $(j+1)^{th}$ environmental image to the $N^{th}$ environmental image at block S104, the method for generating the offline map in the embodiments of the present disclosure further includes the following steps.

The first posture information is fixed, so that the first posture information is not optimized when the second batch of three-dimensional modeling is performed.

It should be noted that, before the second batch of three-dimensional modeling is performed in parallel on the $1^{st}$ to $(i-1)^{th}$ environmental images and the $(j+1)^{th}$ to $N^{th}$ environmental images based on the first posture information and the first world coordinate corresponding to the first test point, in order to ensure the consistency of modeling the environmental images (i.e., the $1^{st}$ to $(i-1)^{th}$ environmental images and the $(j+1)^{th}$ to $N^{th}$ environmental images) in the second batch of three-dimensional modeling, the first posture information may be fixed to prevent from participating in the subsequent update process. That is, both the second posture information obtained from the front segment of environmental images (i.e., the $1^{st}$ to $(i-1)^{th}$ environmental images) and the third posture information obtained from the rear segment of environmental images (i.e., the $(j+1)^{th}$ to $N^{th}$ environmental images) are consistent with the first posture information in the second batch of three-dimensional modeling. As a possible implementation, the process of generating the second world coordinate according to the first environmental image to the $(i-1)^{th}$ environmental image at block S104, as illustrated in FIG. 5, specifically includes the following blocks S401-S402.

At block S401, a three-dimensional modeling is performed on the $(i-1)^{th}$ environmental image based on the first posture information and the first world coordinate corresponding to the first test point, to obtain initial second posture information of the camera and an initial second world coordinate corresponding to the second test point.

For example, based on the 9 pieces of first posture information and the 9 groups of first world coordinate of the first test point, the three-dimensional modeling is performed on the $25^{th}$ environmental image to obtain a $1^{st}$ piece of second posture information (i.e., the initial second posture information) of the camera and a $1^{st}$ group of second world coordinate corresponding to the second test point (i.e., the initial second world coordinate).

At block S402, a third update is performed on the initial second posture information and the initial second world coordinate sequentially according to the $(i-2)^{th}$ environmental image to the first environmental image to generate the second posture information and the second world coordinate corresponding to the second test point.

For example, the third update is performed on the initial second posture information and the initial second world coordinate respectively according to the $24^{th}$ to the first environmental images, so as to generate a $(2-25)^{th}$ piece of second posture information and a $(2-25)^{th}$ group of second world coordinate corresponding to the second test point.

In the embodiments of the present disclosure, after the initial second posture information of the camera and the initial second world coordinate corresponding to the second test point are obtained, the third update is performed to generate the second posture information and the second world coordinate corresponding to the second test point.

Figure 6:
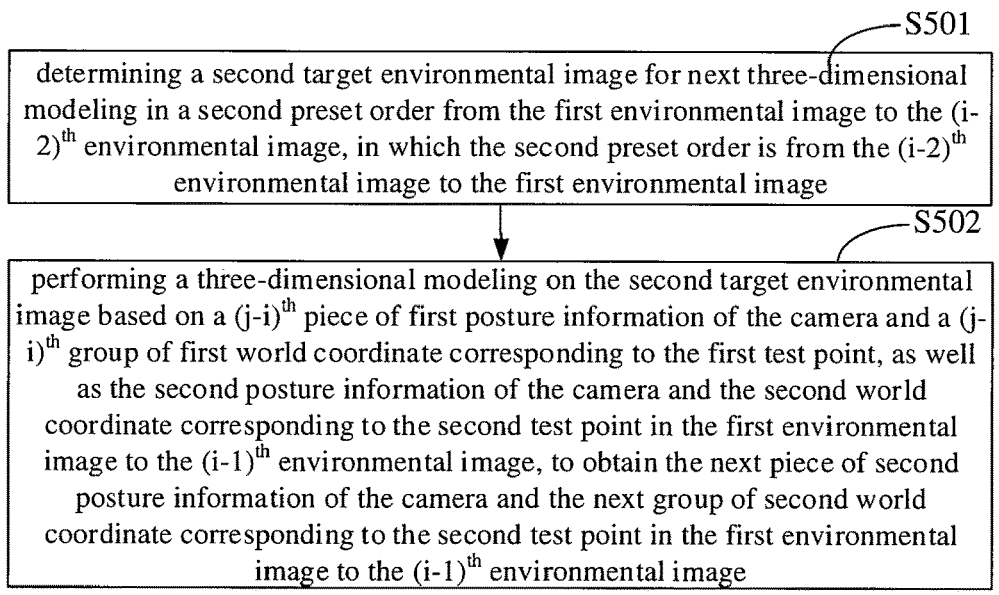
FIG. 6 is a schematic diagram according to Embodiment 5 of the present disclosure.

As a possible implementation, the process of generating the second posture information and the second world coordinate according to the $(i-2)^{th}$ to the first environmental images at block S402, as illustrated in FIG. 6, specifically includes the following blocks S501-S502.

At block S501, a second target environmental image for next three-dimensional modeling is determined in a second preset order from the first to the $(i-2)^{th}$ environmental images, in which the second preset order is from the $(i-2)^{th}$ environmental image to the first environmental image.

For example, the second target environmental image for the next three-dimensional modeling is determined from the $1^{st}$ to $24^{th}$ environmental images in a preset order from the $24^{th}$ environmental image to the $1^{st}$ environmental image.

At block S502, a three-dimensional modeling is performed on the second target environmental image based on a $(j-i)^{th}$ piece of first posture information of the camera, a $(j-i)^{th}$ group of first world coordinate corresponding to the first test point, as well as the obtained second posture information of the camera and the second world coordinate corresponding to the second test point in the $1^{st}$ to $(i-1)^{th}$ environmental images, to obtain the next piece of second posture information of the camera and the next group of second world coordinate corresponding to the second test point in the first environmental image and the $(i-1)^{th}$ environmental image.

For example, based on the 9 pieces of first posture information of the camera, the 9 groups of first world coordinate corresponding to the first test point, as well as the obtained second posture information of the camera and the second world coordinate corresponding to the second test point in the $1^{st}$ to $25^{th}$ environmental images, a three-dimensional modeling is performed on the second target environmental image to obtain the next piece of second posture information of the camera and the next group of second world coordinate of the second test point in the $1^{st}$ to $25^{th}$ environmental images.

Further, it completes until that the three-dimensional modeling is performed on the first environmental image, and the $25^{th}$ piece of second posture information of the camera and the $25^{th}$ group of second world coordinate corresponding to the second test point are obtained.

Thus, after the initial second posture information of the camera and the initial second world coordinate corresponding to the second test point are obtained, the third update of the initial second posture information and the initial second world coordinate are completed sequentially for the divided front segment of environmental images.

Figure 7:
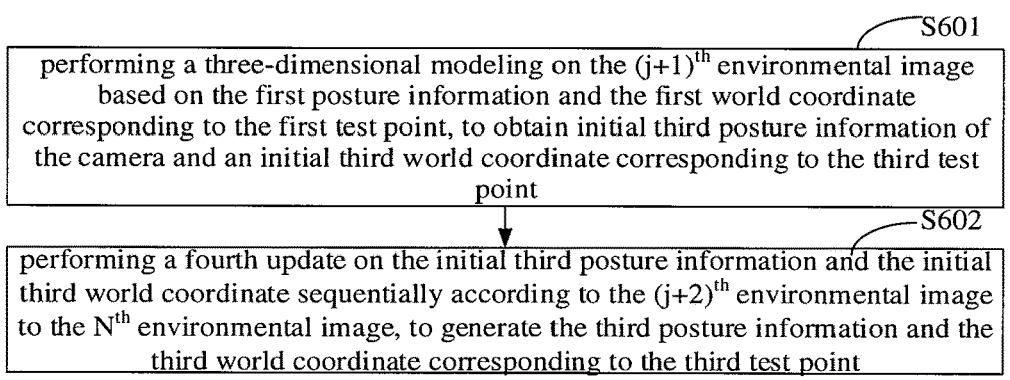
FIG. 7 is a schematic diagram according to Embodiment 6 of the present disclosure.

Based on the above embodiments, the second batch of three-dimensional modeling may be performed on the $(j+1)^{th}$ to $N^{th}$ environmental images based on the first posture information and the first world coordinate corresponding to the first test point, to obtain the third world coordinate corresponding to the third test point in the $(j+1)^{th}$ to $N^{th}$ environmental images. As a possible implementation, the process of generating the third world coordinate according to the $(j+1)^{th}$ environmental image to the $N^{th}$ environmental image at block S104 as illustrated in FIG. 7 specifically includes the following blocks S601-S602.

At block S601, a three-dimensional modeling is performed on the $(j+1)^{th}$ environmental image based on the first posture information and the first world coordinate corresponding to the first test point, to obtain initial third posture information of the camera and an initial third world coordinate corresponding to the third test point.

For example, based on the 9 pieces of the first posture information and the 9 groups of first world coordinate corresponding to the first test point, the three-dimensional modeling is performed on the $36^{th}$ environmental image to obtain a $1^{st}$ piece of third posture information (i.e., the initial third posture information) of the camera and a $1^{st}$ group of third world coordinate corresponding to the third test point (i.e., the initial third world coordinate).

At block S602, a fourth update is performed on the initial third posture information and the initial third world coordinate sequentially according to the $(j+2)^{th}$ environmental image to the $N^{th}$ environmental image, to generate the third posture information and the third world coordinate corresponding to the third test point.

For example, the fourth update is performed on the initial third posture information and the initial third world coordinate respectively according to the $37^{th}$ to $60^{th}$ environmental images to generate the $(2-25)^{th}$ piece of third posture information and the $(2-25)^{th}$ group of third world coordinate corresponding to the third test points.

Figure 8:
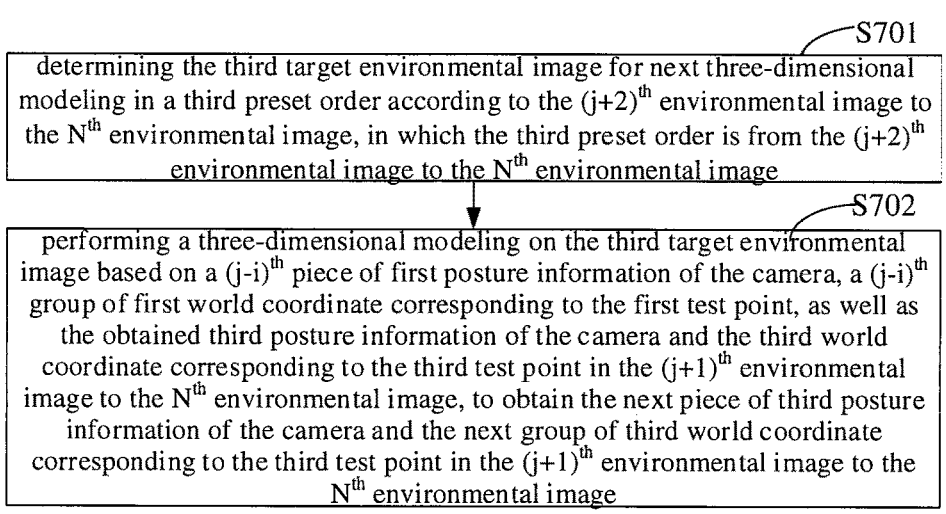
FIG. 8 is a schematic diagram according to Embodiment 7 of the present disclosure.

As a possible implementation, as illustrated in FIG. 8, based on the above embodiments, the process of performing the second batch of three-dimensional modeling according to the $(j+2)^{th}$ to the $N^{th}$ environmental images at block S602 includes the following blocks S701-S702.

At block S701, a third target environmental image for next three-dimensional modeling is determined in a third preset order according to the $(j+2)^{th}$ environmental image to the $N^{th}$ environmental image, in which the third preset order is the $(j+2)^{th}$ environmental image to the $N^{th}$ environmental image.

For example, for the $37^{th}$ to $60^{th}$ environmental images, the third target environmental image for the next three-dimensional modeling may be determined in the order from the $37^{th}$ environmental image to the $60^{th}$ environmental image.

At block S702, a three-dimensional modeling is performed on the third target environmental image based on a $(j-i)^{th}$ piece of first posture information of the camera, a $(j-i)^{th}$ group of first world coordinate corresponding to the first test point, as well as the obtained third posture information of the camera and the third world coordinate corresponding to the third test point in the $(j+1)^{th}$ environmental image to the $N^{th}$ environmental image, to obtain the next piece of third posture information of the camera and the next group of third world coordinate corresponding to the third test point in the $(j+1)^{th}$ environmental image to the $N^{th}$ environmental image.

For example, based on the 9 pieces of first posture information of the camera, the 9 groups of first world coordinate corresponding to the first test point, as well as the obtained third posture information of the camera and the third world coordinate corresponding to the third test point in the $36^{th}$ to $60^{th}$ environmental images, a three-dimensional modeling is performed on the third target environmental image to obtain the next piece of third posture information of the camera and the next group of third world coordinate corresponding to the third test point in the $36^{th}$ to $60^{th}$ environmental images.

Further, it completes until that the three-dimensional modeling is performed on the $60^{th}$ environmental image, and the $25^{th}$ piece of third posture information of the camera and the $25^{th}$ group of third world coordinate corresponding to the third test point are obtained.

Thus, after the initial third posture information of the camera and the initial third world coordinate corresponding to the third test point are obtained, the fourth update of the initial third posture information and the initial third world coordinate is completed sequentially for the divided rear segment of environmental images.

According to the method for generating the offline map in the embodiments of the present disclosure, after the first batch of three-dimensional modeling is performed on the middle segment of environment images, the second batch of three-dimensional modeling is performed on the divided two segments (i.e., the front and rear segments) of environmental images in parallel, so that the initial second world coordinate corresponding to the second test point and the initial third world coordinate corresponding to the third test point are continuously optimized, and the initial second world coordinate and the results after multiple optimizations are taken as the second world coordinate, the initial third world coordinate and the results after multiple optimizations are taken as the third world coordinate, thereby improving the accuracy of the second batch of three-dimensional modeling. Furthermore, the second batch of three-dimensional modeling is carried out in parallel, which not only ensures the accuracy of the second batch of three-dimensional modeling, but also shortens the time consumption for the second batch of three-dimensional modeling, so that modeling is completed as rapidly as possible on the target road section to obtain an accurate offline map.

It should be noted that in practical applications, when performing three-dimensional modeling based on the environmental images collected by the camera, since there may be a certain deviation between the positions where feature points of the environmental images (two-dimensional images) are re-projected back into the three-dimensional domain and the positions of real three-dimensional points, an Bundle Adjustment (BA) is used to reduce the deviation as much as possible in the present disclosure.

The BA includes the following stages: a plurality of Local Bundle Adjustment (Local-BA), a plurality of Global Bundle Adjustment (Global-BA), and a Final Bundle Adjustment (Final-BA).

Further, since the Local-BA may have been completed when the Final-BA is performed, the optimized image sequence obtained after the Global-BA may be repeated with that obtained after the Local-BA. Therefore, a number of Local-BAs is appropriately reduced. For example, the Global-BAs are performed in each time of three-dimensional modeling, while the Local-BAs are selectively performed. For example, the Global-BAs are performed from the $5^{th}$ to the $1^{st}$ environmental images, but the Local-BAs are performed only on the $5^{th}$, $3^{rd}$, and $1^{st}$ environmental images.

In the present disclosure, a time-consuming analysis is performed, where a targeted optimization to the highly time-consuming phases is performed to shorten the time-consumption of bundle adjustment as much as possible on the basis of ensuring the accuracy of three-dimensional modeling.

Optionally, the time-consumption of the Local-BA and the Global-BA are obtained, and the obtained time-consumption is compared with a preset time-consumption. If it is determined that the obtained time-consumption is greater than the preset time-consumption, indicating that the current bundle adjustment needs to be optimized, a number of cycles in the optimization is reduced according to a preset number of times or some sub-optimization stages are skipped. If it is determined that the time-consumption is less than or equal to the preset time-consumption, indicating that the current bundle adjustment does not need to be optimized, the current bundle adjustment method may be kept.

Figure 9:
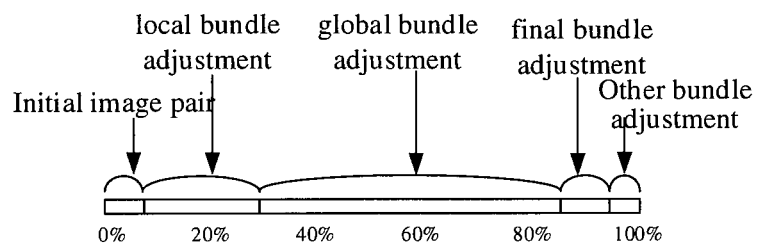
FIG. 9 is a schematic diagram of time-consuming situations in different control stages.

For example, as illustrated in FIG. 9, the Local-BA process accounts for about 25% of the total time-consumption, the Global-BA process accounts for about 55% of the total time-consumption, and the preset time-consumption accounts for 70% of the total time-consumption. It is known that the Local-BA process and the Global-BA process take a long time. At this time, the number of Local-BAs is reduced to cut down the time-consumption.

According to the method for generating the offline map in the embodiments of the present disclosure, after completing two batches of three-dimensional modeling, the BA may be used to reduce the deviation between the positions where feature points of environmental images are re-projected back into the three-dimensional domain and the positions of real three-dimensional points, so as to ensure the accuracy of three-dimensional modeling. Further, in the process of performing the BA, it is also possible to optimize the BA through time-consuming analysis on the adjustment process, so as to reduce the time-consumption of BA while ensuring the effectiveness of BA.

It should be noted that, in this disclosure, after the offline map for the target road section is obtained, a driving strategy for instructing the user to travel on the target road section is generated to control the vehicle to drive on the target road section according to the offline map.

Figure 10:
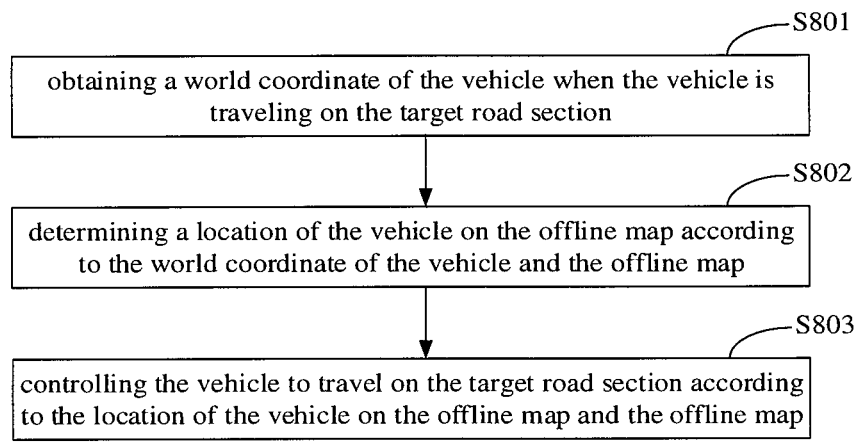
FIG. 10 is a schematic diagram according to Embodiment 8 of the present disclosure.

As a possible implementation, as illustrated in FIG. 10, on the basis of the above embodiments, after completing the block S105, the offline map for the target road section is generated, the vehicle is controlled to travel on the target road section according to the offline map. The process of controlling the vehicle to travel includes the following blocks S801-S803.

At block S801, a world coordinate of the vehicle when the vehicle is traveling on the target road section is obtained.

Optionally, the world coordinate of the vehicle when the vehicle is traveling on the target road section is determined according to the offline map established before driving to the same target road section.

At block S802, a location of the vehicle on the offline map is determined according to the world coordinate of the vehicle and the offline map.

Optionally, after the world coordinate of the vehicle is obtained while the vehicle is traveling on the target road section, the location of the vehicle on the offline map at this time may be determined according to the world coordinate of the vehicle and the offline map at this time.

At block S803, the vehicle is controlled to travel on the target road section according to the location of the vehicle on the offline map and the offline map.

Optionally, after the location of the vehicle on the offline map at this time is obtained, a driving strategy for instructing the user to travel on the target road section may be generated according to the vehicle location and the offline map, so as to control the vehicle to travel on the target road section according to the driving strategy.

It should be noted that the method for generating the offline map in this disclosure is applied to a variety of vehicle control scenarios.

For automatic parking application scenarios, a road section between a user's commonly used drop-off location (such as a garage entrance) and a commonly used parking space is set as the target road section, and after the location of the vehicle on the offline map and the offline map are obtained, the vehicle is controlled to travel according to the driving strategy to accurately and automatically drive into the common parking space upon arrival to the commonly used drop-off location. As a result, starting from arriving at the commonly used drop-off location, the vehicle may be accurately and automatically parked into the parking space without any operation from the drivers, which realizes autonomous parking and greatly improves the user experience.

For highway driving application scenarios, a road section between a user's commonly used expressway entrance and a commonly used expressway exit is set as the target road section, and after the location of the vehicle on the offline map and the offline map are obtained, the vehicle is controlled to drive according to the driving strategy to accurately and automatically exit from the commonly used expressway exit upon arrival to the commonly used expressway entrance. As a result, starting from arriving at the commonly used expressway entrance, the vehicle may be accurately and automatically entered into a ramp from the expressway. In particular, for the highway driving application scenarios, when trying to control the vehicle to travel on the target road section, the vehicle may be automatically driven at a fixed speed required from the driver in combination with the cruise control, after entering from the common highway entrance. In this way, unnecessary speed changes are reduced and the goal of energy saving and emission reduction is achieved while the driver's hands are free and the user experience is improved.

For driving school training application scenarios, correct operation routes for different test subjects of the user may be set as the target road section, and after the location of the vehicle on the offline map and the offline map are obtained, the vehicle is controlled to drive accurately and automatically to an end of the correct operating route according to the driving strategy upon arrival to a starting point of the correct operation route. As a result, trainees clearly observe a correct driving trajectory of the vehicle starting from the starting point of the correct operation route, and train independently according to the observed trajectory, without personal demonstration from the driving instructor, which greatly reduces labor cost of a driving school and provides a more effective training way to students in learning to drive.

According to the method for generating the offline map in the embodiments of the present disclosure, after the offline map is generated, the world coordinate of the vehicle when traveling on the target road section is obtained, and the location of the vehicle is determined on the offline map according to the obtained world coordinates of the vehicle and offline map, and the vehicle is controlled to travel on the target road section according to the driving strategy based on the location of the vehicle and the offline map, so as to achieve the release of the driver's hands and improve the user experience on the basis of ensuring driving safety of the vehicle in the process of traveling on the target road section.

Figure 11:
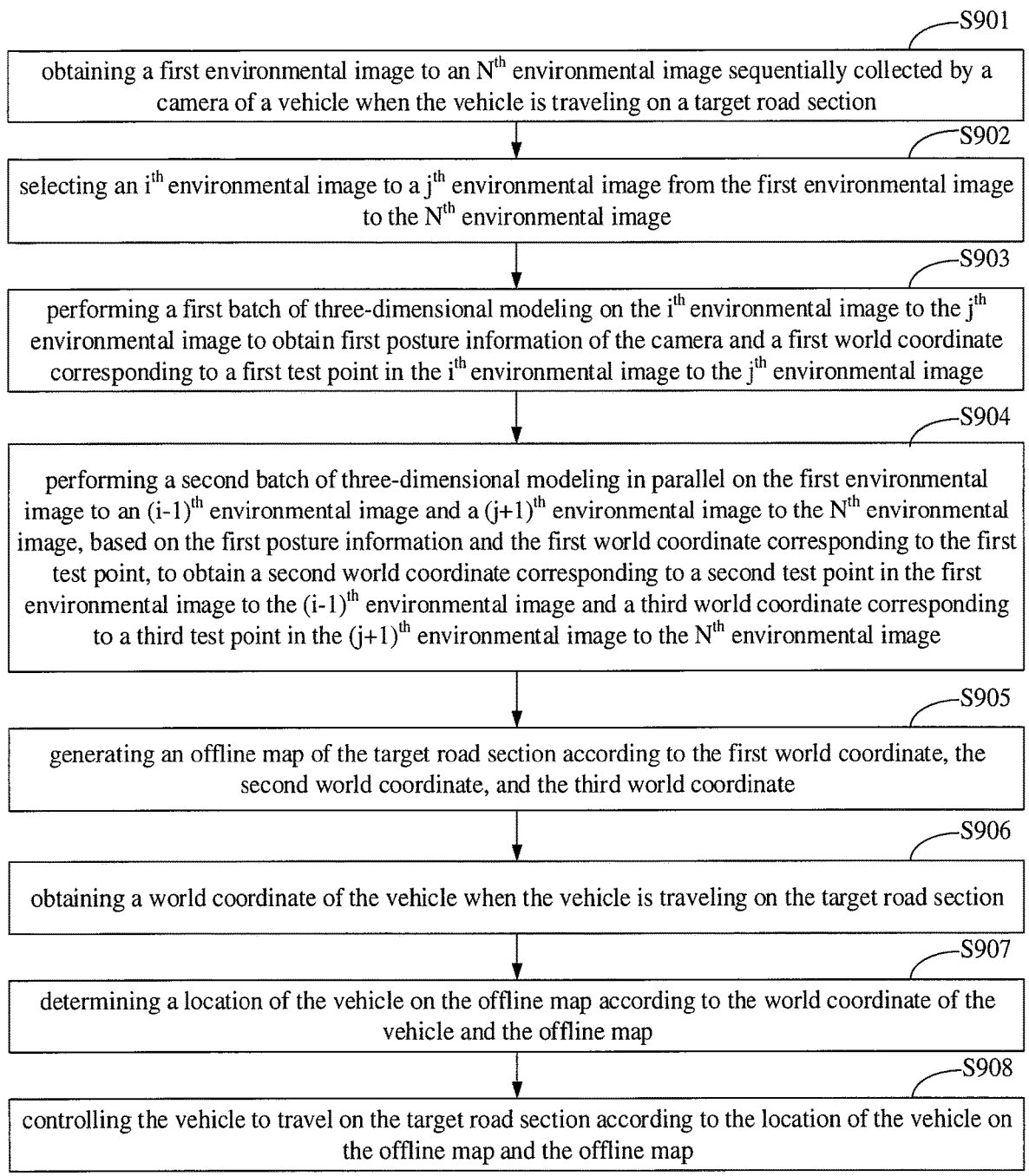
FIG. 11 is a schematic diagram according to Embodiment 9 of the present disclosure.

FIG. 11 is a schematic diagram according to Embodiment 9 of the present disclosure. As illustrated in FIG. 11, On the basis of the above embodiments, the method for generating the offline map according to this embodiment includes the following blocks S901-S901.

At block S901, a first environmental image to an $N^{th}$ environmental image sequentially collected by a camera of a vehicle are obtained when the vehicle is traveling on a target road section.

At block S902, an $i^{th}$ environmental image to a $j^{th}$ environmental image are selected from the first environmental image to the $N^{th}$ environmental image.

At block S903, a first batch of three-dimensional modeling is performed on the $i^{th}$ environmental image to the $j^{th}$ environmental image to obtain first posture information of the camera and a first world coordinate corresponding to a first test point in the $i^{th}$ environmental image to the $j^{th}$ environmental image.

At block S904, a second batch of three-dimensional modeling is performed in parallel on the first environmental image to an $(i-1)^{th}$ environmental image and from a $(j+1)^{th}$ environmental image to the $N^{th}$ environmental image, based on the first posture information and the first world coordinate corresponding to the first test point, to obtain a second world coordinate corresponding to a second test point in the first environmental image to the $(i-1)^{th}$ environmental image, and a third world coordinate corresponding to a third test point in the $(j+1)^{th}$ environmental image to the $N^{th}$ environmental image.

At block S905, an offline map of the target road section is generated according to the first world coordinate, the second world coordinate, and the third world coordinate.

At block S906, a world coordinate of the vehicle is obtained when the vehicle is traveling on the target road section.

Optionally, the world coordinate of the vehicle when the vehicle is traveling on the target road section is determined according to the offline map established before driving to the same target road section.

At block S907, a location of the vehicle is determined on the offline map according to the world coordinate of the vehicle and the offline map.

Optionally, after obtaining the world coordinate of the vehicle while the vehicle is traveling on the target road section, it is possible to determine the location of the vehicle on the offline map at this time according to the world coordinate of the vehicle and the offline map at this time.

At block S908, the vehicle is controlled to travel on the target road section according to the location of the vehicle on the offline map and the offline map.

Blocks S901 to S905 are the same as blocks S101 to S105 in the embodiments shown in FIG. 1, and blocks S906 to S908 are the same as blocks S801 to S803 in the embodiments shown in FIG. 10.

According to the method for generating the offline map in the embodiments of the present disclosure, the environmental images sequentially collected by the camera may be obtained when the vehicle is traveling on the target road section, and a segment of environmental images are extracted from the obtained environmental images for the first batch of three-dimensional modeling. After the first posture information of the camera and the first world coordinate corresponding to the first test point are obtained, the second batch of three-dimensional modeling is performed in parallel according to the remaining environmental images, so as to obtain the second world coordinate corresponding to the second test point and the third world coordinate corresponding to the third test point and generate the offline map based on the obtained world coordinates. The vehicle is controlled to drive on the target road section based on the offline map, which not only ensures the accuracy of the two batches of three-dimensional modeling, but also shortens the time-consuming process of three-dimensional modeling. Furthermore, the driving of the vehicle may be controlled based on the offline map instantly established in the historical driving process, without obtaining the offline map from other platforms in advance. The offline map is ready to be learned and used, thereby improving the effectiveness and safety of the vehicle control process.

Figure 12:
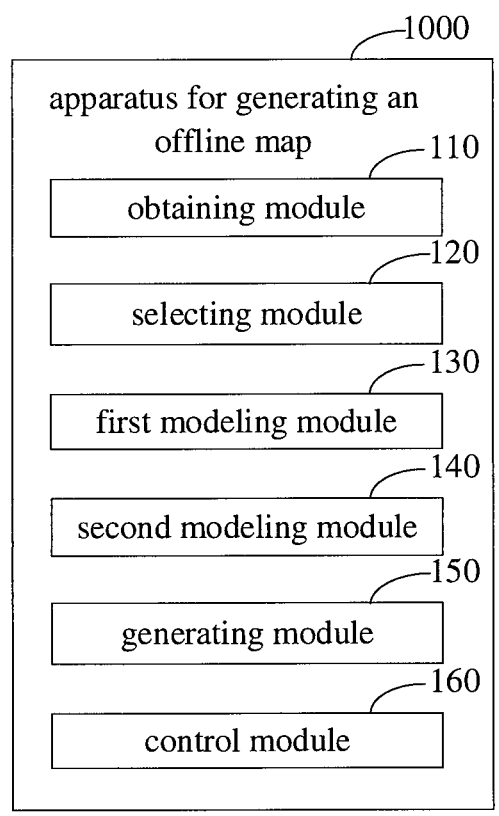
FIG. 12 is a block diagram of an apparatus for generating an offline map configured to implement the method for generating the offline map according to an embodiment of the present disclosure.
Figure 13:
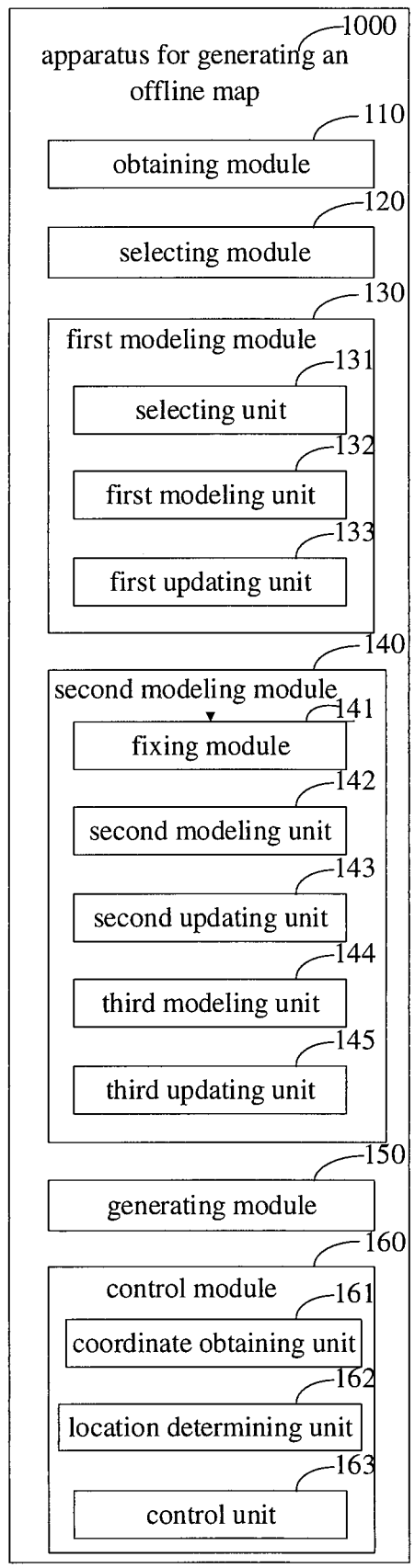
FIG. 13 is a block diagram of an apparatus for generating an offline map configured to implement the method for generating the offline map according to an embodiment of the present disclosure.

The embodiments of the present disclosure also provide an apparatus for generating the offline map, compared to the method for generating the offline map according to the above embodiments, since the apparatus for generating the offline map corresponds to the method for generating the offline map, the embodiments of the method for generating the offline map is applicable for the apparatus for generating the offline map, which are not limited in the present embodiment. FIG. 12 to FIG. 13 are block diagram of an apparatus for generating an offline map according to an embodiment of the present disclosure.

As illustrated in FIG. 12, the apparatus for generating an offline map 1000 includes: an obtaining module 110, a selecting module 120, a first modeling module 130, a second modeling module 140 and a generating module 150.

The obtaining module 110 is configured to obtain a first environmental image to an $N^{th}$ environmental image sequentially collected by a camera of a vehicle when the vehicle is traveling on a target road section, in which N is a positive integer.

The selecting module 120 is configured to select an $i^{th}$ environmental image to a $j^{th}$ environmental image from the first environmental image to the $N^{th}$ environmental image, in which i is a positive integer greater than 1 and less than j, and j is a positive integer less than N; The first modeling module 130 is configured to perform a first batch of three-dimensional modeling on the $i^{th}$ environmental image to the $j^{th}$ environmental image to obtain first posture information of the camera and a first world coordinate corresponding to a first test point in the $i^{th}$ environmental image to the $j^{th}$ environmental image.

The second modeling module 140 is configured to perform a second batch of three-dimensional modeling in parallel on the first environmental image to an $(i-1)^{th}$ environmental image and a $(j+1)^{th}$ environmental image to the $N^{th}$ environmental image, based on the first posture information and the first world coordinate corresponding to the first test point, to obtain a second world coordinate corresponding to a second test point in the first environmental image to the $(i-1)^{th}$ environmental image, and a third world coordinate corresponding to a third test point in the $(j+1)^{th}$ environmental image to the $N^{th}$ environmental image.

The generating module 150 is configured to generate an offline map of the target road section according to the first world coordinate, the second world coordinate, and the third world coordinate.

In the embodiments of the present disclosure, as illustrated in FIG. 13, the second modeling module 140 in FIG. 12 includes: a fixing module 141, configured to fix the first posture information, so that the first posture information is not optimized when the second batch of three-dimensional modeling is performed.

In the embodiments of the present disclosure, as illustrated in FIG. 13, the first modeling module 130 in FIG. 12 includes: a selecting unit 131, a first modeling unit 132 and a first updating unit 133.

The selecting unit 131 is configured to select a $k^{th}$ environmental image to a $(k+1)^{th}$ environmental image from the $i^{th}$ environmental image to the $j^{th}$ environmental image as an initial image pair, in which k is a positive integer equal to or greater than i and equal to or less than j−1.

The first modeling unit 132 is configured to perform a three-dimensional modeling on the initial image pair to obtain initial first posture information of the camera and an initial first world coordinate corresponding to the first test point.

The first updating unit 133 is configured to perform a first update on the initial first posture information and the initial first world coordinate sequentially according to the $(k-1)^{th}$ environmental image to the $i^{th}$ environmental image, and perform a second update on the initial first posture information and the initial first world coordinate sequentially according to a $(k+2)^{th}$ environmental image to the $j^{th}$ environmental image, to generate the first posture information and the first world coordinate corresponding to the first test point.

In the embodiments of the present disclosure, as illustrated in FIG. 13, the selecting unit 131 is configured to: select the $k^{th}$ environmental image to the $(k+1)^{th}$ environmental image as the initial image pair according to an parallactic angle between any adjacent two environmental images from the $i^{th}$ environmental image to the $j^{th}$ environmental image and/or a number of the first test point.

In the embodiments of the present disclosure, as illustrated in FIG. 13, the second modeling module 140 in FIG. 12 includes: a second modeling unit 142 and a second updating unit 143.

The second modeling unit 142 is configured to perform a three-dimensional modeling on the $(i-1)^{th}$ environmental image based on the first posture information and the first world coordinate corresponding to the first test point, to obtain initial second posture information of the camera and an initial second world coordinate corresponding to the second test point.

The second updating unit 143 is configured to perform a third update on the initial second posture information and the initial second world coordinate sequentially according to the $(i-2)^{th}$ environmental image to the first environmental image to generate the second posture information and the second world coordinate corresponding to the second test point.

In the embodiments of the present disclosure, as illustrated in FIG. 13, the second modeling module 140 in FIG. 12 includes: a third modeling unit 144 and a third updating unit 145.

The third modeling unit 144 is configured to perform a three-dimensional modeling on the $(j+1)^{th}$ environmental image based on the first posture information and the first world coordinate corresponding to the first test point, to obtain initial third posture information of the camera and an initial third world coordinate corresponding to the third test point.

The third updating unit 145 is configured to perform a fourth update on the initial third posture information and the initial third world coordinate sequentially according to the $(j+2)^{th}$ environmental image to the $N^{th}$ environmental image, to generate the third posture information and the third world coordinate corresponding to the third test point.

In the embodiments of the present disclosure, the first modeling module 130 in FIG. 12 is configured to perform the first batch of three-dimensional modeling with a motion recovery structure algorithm, and the second modeling module 140 in FIG. 13 is configured to perform the second batch of three-dimensional modeling with a motion recovery structure algorithm.

In the embodiments of the present disclosure, the apparatus 1000 for generating an offline map in FIG. 12 further includes: a control module 160, configured to control the vehicle to travel on the target road section according to the offline map.

In the embodiments of the present disclosure, as illustrated in FIG. 13, the control module 160 in FIG. 12 includes: a coordinate obtaining unit 161, a location determining unit 162 and a control unit 163.

The coordinate obtaining unit 161 is configured to obtain a world coordinate of the vehicle when the vehicle is traveling on the target road section.

The location determining unit 162 is configured to determine a location of the vehicle on the offline map according to the world coordinate of the vehicle and the offline map.

The control unit 163 is configured to control the vehicle to travel on the target road section according to the location of the vehicle on the offline map and the offline map.

According to the method for generating the offline map in the embodiments of the present disclosure, the environmental images sequentially collected by the camera may be obtained when the vehicle is traveling on the target road section, and a segment of environmental images are extracted from the obtained environmental images to perform the first batch of three-dimensional modeling and obtain the first posture information of the camera and the first world coordinate corresponding to the first test point. Then the remaining environmental images are divided into two segments (the front and rear segments), and the second batch of three-dimensional modeling is performed on the two segments of environmental images in parallel to obtain the second world coordinate corresponding to the second test point and the third world coordinate corresponding to the third test point. The offline map is generated based on the obtained world coordinates, which ensures the accuracy of two batches of three-dimensional modeling and shortens the time-consuming process of three-dimensional modeling. The offline map ready to learn and use may be generated without obtaining the offline map from other platforms in advance, thereby ensuring autonomous driving, especially effectiveness and safety of autonomous driving and parking.

According to the embodiments of the present disclosure, the disclosure also provides an electronic device and a readable storage medium.

Figure 14:
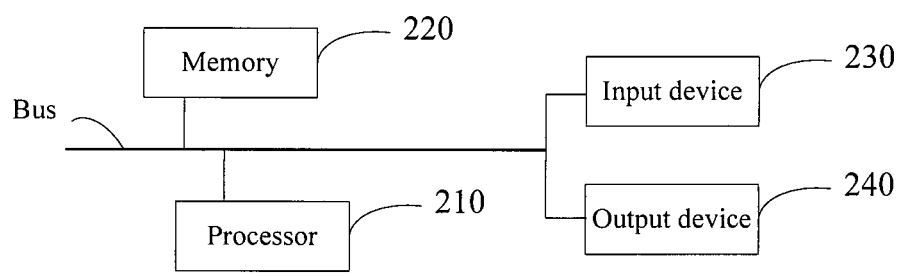
FIG. 14 is a block diagram of an electronic device for generating an offline map configured to implement the method for generating the offline map according to an embodiment of the present disclosure.

FIG. 14 is a block diagram of an electronic device used to implement the method for generating an offline map according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 14, the electronic device includes: one or more processors 210, a memory 220, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 210 is taken as an example in FIG. 14.

The memory 220 is a non-transitory computer-readable storage medium according to the disclosure. The memory is stored with instructions executable by at least one processor, so that the at least one processor executes the method according to the disclosure. The non-transitory computer-readable storage medium of the disclosure is stored with computer instructions, which are used to cause a computer to execute the method according to the disclosure.

As a non-transitory computer-readable storage medium, the memory 220 is configured to store non-transitory software programs, non-transitory computer executable programs and modules, such as program instructions/modules (for example, the obtaining module 110, the selecting module 120, the first modeling module 130, the second modeling module 140, and the generating module 150 shown in FIG. 12) corresponding to the method in the embodiment of the present disclosure. The processor 210 executes various functional applications and data processing of the server by running non-transitory software programs, instructions, and modules stored in the memory 220, that is, implementing the method in the foregoing method embodiments.

The memory 220 may include a storage program area and a storage data area, where the storage program area may store an operating system and application programs required for at least one function. The storage data area may store data created according to the use of the electronic device for implementing the method. In addition, the memory 220 may include a high-speed random access memory, and a non-transitory memory, such as at least one magnetic disk storage device, a flash memory device, or other non-transitory solid-state storage device. In some embodiments, the memory 220 may optionally include a memory remotely disposed with respect to the processor 210, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 230 and an output device 240. The processor 210, the memory 220, the input device 230, and the output device 240 may be connected through a bus or in other manners. In FIG. 13, the connection through the bus is taken as an example.

The input device 230 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 240 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the method for generating the offline map in the embodiments of the present disclosure, the environmental images sequentially collected by the camera may be obtained when the vehicle is traveling on the target road section, and a segment of environmental images are extracted from the obtained environmental images to perform the first batch of three-dimensional modeling and obtain the first posture information of the camera and the first world coordinate corresponding to the first test point. The remaining environment images are divided into two segments (the front and rear segments), and the second batch of three-dimensional modeling is performed on the two segments of environmental images in parallel to obtain the second world coordinate corresponding to the second test point and the third world coordinate corresponding to the third test point. The offline map is generated according to the obtained world coordinates, which ensures the accuracy of two batches of three-dimensional modeling and shortens the time-consuming process of the three-dimensional modeling. The offline map ready to learn and use may be generated without obtaining the offline map from other platforms in advance, thereby ensuring effectiveness and safety of autonomous driving, especially in the process of autonomous parking.

Figure 15:
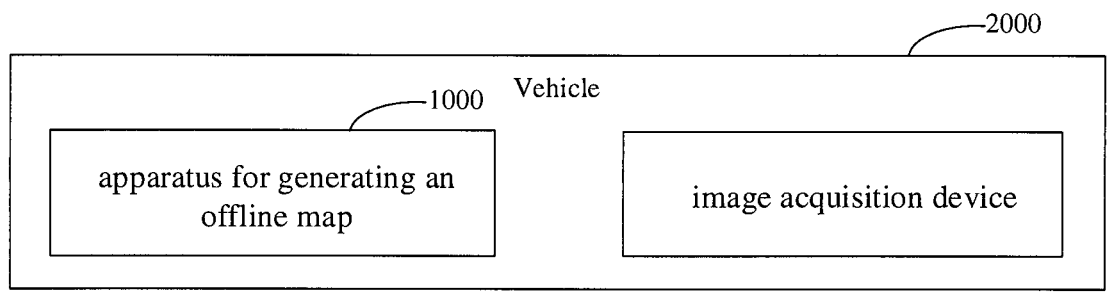
FIG. 15 is a block diagram of a vehicle.

According to the embodiments of the present disclosure, the present disclosure also provides a vehicle 2000. As illustrated in FIG. 15, the vehicle 2000 includes: the apparatus 1000 for generating an offline map in the above embodiments.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for generating an offline map, performed by an electronic device, comprising:
    obtaining a first environmental image to an $N^{th}$ environmental image sequentially collected by a camera of a vehicle when the vehicle is traveling on a target road section, where N is a positive integer;
    selecting an $i^{th}$ environmental image to a $j^{th}$ environmental image from the first environmental image to the $N^{th}$ environmental image, where i is a positive integer greater than 1 and less than j, and j is a positive integer less than N;
    performing a first batch of three-dimensional modeling on the $i^{th}$ environmental image to the $j^{th}$ environmental image to obtain first posture information of the camera and a first world coordinate corresponding to a first test point in the $i^{th}$ environmental image to the $j^{th}$ environmental image;
    performing a second batch of three-dimensional modeling in parallel on the first environmental image to an $(i-1)^{th}$ environmental image and a $(j+1)^{th}$ environmental image to the $N^{th}$ environmental image, based on the first posture information and the first world coordinate corresponding to the first test point, to obtain a second world coordinate corresponding to a second test point in the first environmental image to the $(i-1)^{th}$ environmental image, and a third world coordinate corresponding to a third test point in the $(j+1)^{th}$ environmental image to the $N^{th}$ environmental image; and
    generating an offline map of the target road section according to the first world coordinate, the second world coordinate, and the third world coordinate;
    wherein before performing the second batch of three-dimensional modeling, the method further comprises:
    fixing the first posture information, so that the first posture information is not optimized when the second batch of three-dimensional modeling is performed.

2. The method according to claim 1, wherein performing the first batch of three-dimensional modeling on the $i^{th}$ environmental image to the $j^{th}$ environmental image to obtain the first posture information of the camera and the first world coordinate corresponding to the first test point in the $i^{th}$ environmental image to the $j^{th}$ environmental image, comprises:
    selecting a $k^{th}$ environmental image to a $(k+1)^{th}$ environmental image from the $i^{th}$ environmental image to the $j^{th}$ environmental image as an initial image pair, where k is a positive integer equal to or greater than i and equal to or less than j−1;
    performing a three-dimensional modeling on the initial image pair to obtain initial first posture information of the camera and an initial first world coordinate corresponding to the first test point; and
    performing a first update on the initial first posture information and the initial first world coordinate sequentially according to the $(k-1)^{th}$ environmental image to the $i^{th}$ environmental image, and performing a second update on the initial first posture information and the initial first world coordinate sequentially according to a $(k+2)^{th}$ environmental image to the $j^{th}$ environmental image, to generate the first posture information and the first world coordinate corresponding to the first test point.

3. The method according to claim 1, wherein performing the second batch of three-dimensional modeling on the first environmental image to the $(i-1)^{th}$ environmental image, based on the first posture information and the first world coordinate corresponding to the first test point, to obtain the second world coordinate corresponding to the second test point in the first environmental image to the $(i-1)^{th}$ environmental image, comprises:
    performing a three-dimensional modeling on the $(i-1)^{th}$ environmental image based on the first posture information and the first world coordinate corresponding to the first test point, to obtain initial second posture information of the camera and an initial second world coordinate corresponding to the second test point; and
    performing a third update on the initial second posture information and the initial second world coordinate sequentially according to the $(i-2)^{th}$ environmental image to the first environmental image to generate the second posture information and the second world coordinate corresponding to the second test point.

4. The method according to claim 1, wherein performing the second batch of three-dimensional modeling on the $(j+1)^{th}$ environmental image to the $N^{th}$ environmental image, based on the first posture information and the first world coordinate corresponding to the first test point, to obtain the third world coordinate corresponding to the third test point in the $(j+1)^{th}$ environmental image to the $N^{th}$ environmental image, comprises:
    performing a three-dimensional modeling on the $(j+1)^{th}$ environmental image based on the first posture information and the first world coordinate corresponding to the first test point, to obtain initial third posture information of the camera and an initial third world coordinate corresponding to the third test point; and
    performing a fourth update on the initial third posture information and the initial third world coordinate sequentially according to the $(j+2)^{th}$ environmental image to the $N^{th}$ environmental image, to generate the third posture information and the third world coordinate corresponding to the third test point.

5. The method according to claim 1, further comprising:
performing the first batch of three-dimensional modeling and the second batch of three-dimensional modeling with a motion recovery structure algorithm.

6. The method according to claim 1, further comprising:
controlling the vehicle to travel on the target road section according to the offline map.

7. The method according to claim 6, wherein controlling the vehicle to travel on the target road section according to the offline map comprises:
obtaining a world coordinate of the vehicle when the vehicle is traveling on the target road section;
determining a location of the vehicle on the offline map according to the world coordinate of the vehicle and the offline map; and
controlling the vehicle to travel on the target road section according to the location of the vehicle on the offline map and the offline map.

8. An apparatus for generating an offline map, comprising:
at least one processor; and
a memory communicatively connected with the at least one processor;
wherein the at least one processor is configured to:
obtain a first environmental image to an $N^{th}$ environmental image sequentially collected by a camera of a vehicle when the vehicle is traveling on a target road section, wherein N is a positive integer;
select an $i^{th}$ environmental image to a $j^{th}$ environmental image from the first environmental image to the $N^{th}$ environmental image, wherein i is a positive integer greater than 1 and less than j, and j is a positive integer less than N;
perform a first batch of three-dimensional modeling on the $i^{th}$ environmental image to the $j^{th}$ environmental image to obtain first posture information of the camera and a first world coordinate corresponding to a first test point in the $i^{th}$ environmental image to the $j^{th}$ environmental image;
fix the first posture information, so that the first posture information is not optimized when the second batch of three-dimensional modeling is performed;
perform a second batch of three-dimensional modeling in parallel on the first environmental image to an $(i-1)^{th}$ environmental image and a $(j+1)^{th}$ environmental image to the $N^{th}$ environmental image, based on the first posture information and the first world coordinate corresponding to the first test point, to obtain a second world coordinate corresponding to a second test point in the first environmental image to the $(i-1)^{th}$ environmental image, and a third world coordinate corresponding to a third test point in the $(j+1)^{th}$ environmental image to the $N^{th}$ environmental image; and
generate an offline map of the target road section according to the first world coordinate, the second world coordinate, and the third world coordinate.

9. The apparatus according to claim 8, wherein the at least one processor is further configured to:
select a $k^{th}$ environmental image to a $(k+1)^{th}$ environmental image from the $i^{th}$ environmental image to the $j^{th}$ environmental image as an initial image pair, wherein k is a positive integer equal to or greater than i and equal to or less than j−1;
perform a three-dimensional modeling on the initial image pair to obtain initial first posture information of the camera and an initial first world coordinate corresponding to the first test point; and
perform a first update on the initial first posture information and the initial first world coordinate sequentially according to the $(k-1)^{th}$ environmental image to the $i^{th}$ environmental image, and perform a second update on the initial first posture information and the initial first world coordinate sequentially according to a $(k+2)^{th}$ environmental image to the $j^{th}$ environmental image, to generate the first posture information and the first world coordinate corresponding to the first test point.

10. The apparatus according to claim 8, wherein the at least one processor is further configured to:
perform a three-dimensional modeling on the $(i-1)^{th}$ environmental image based on the first posture information and the first world coordinate corresponding to the first test point, to obtain initial second posture information of the camera and an initial second world coordinate corresponding to the second test point; and
perform a third update on the initial second posture information and the initial second world coordinate sequentially according to the $(i-2)^{th}$ environmental image to the first environmental image to generate the second posture information and the second world coordinate corresponding to the second test point.

11. The apparatus according to claim 8, wherein the at least one processor is further configured to:
perform a three-dimensional modeling on the $(j+1)^{th}$ environmental image based on the first posture information and the first world coordinate corresponding to the first test point, to obtain initial third posture information of the camera and an initial third world coordinate corresponding to the third test point; and
perform a fourth update on the initial third posture information and the initial third world coordinate sequentially according to the $(j+2)^{th}$ environmental image to the $N^{th}$ environmental image, to generate the third posture information and the third world coordinate corresponding to the third test point.

12. The apparatus according to claim 8, wherein the at least one processor is further configured to:
perform the first batch of three-dimensional modeling and the second batch of three-dimensional modeling with a motion recovery structure algorithm.

13. The apparatus according to claim 8, wherein the at least one processor is further configured to:
control the vehicle to travel on the target road section according to the offline map.

14. The apparatus according to claim 13, wherein the at least one processor is further configured to:
obtain a world coordinate of the vehicle when the vehicle is traveling on the target road section;
determine a location of the vehicle on the offline map according to the world coordinate of the vehicle and the offline map; and
control the vehicle to travel on the target road section according to the location of the vehicle on the offline map and the offline map.

15. A vehicle, comprising:
a camera, configured to collect a first environmental image to an $N^{th}$ environmental image sequentially when the vehicle is traveling on a target road section, where N is a positive integer; and
a processor, configured to
obtain the first environmental image to the $N^{th}$ environmental image;
select an $i^{th}$ environmental image to a $j^{th}$ environmental image from the first environmental image to the $N^{th}$ environmental image, where i is a positive integer greater than 1 and less than j, and j is a positive integer less than N;

perform a first batch of three-dimensional modeling on the $i^{th}$ environmental image to the $j^{th}$ environmental image to obtain first posture information of the camera and a first world coordinate corresponding to a first test point in the $i^{th}$ environmental image to the $j^{th}$ environmental image;

fix the first posture information, so that the first posture information is not optimized when the second batch of three-dimensional modeling is performed;

perform a second batch of three-dimensional modeling in parallel on the first environmental image to an $(i-1)^{th}$ environmental image and a $(j+1)^{th}$ environmental image to the $N^{th}$ environmental image, based on the first posture information and the first world coordinate corresponding to the first test point, to obtain a second world coordinate corresponding to a second test point in the first environmental image to the $(i-1)^{th}$ environmental image, and a third world coordinate corresponding to a third test point in the $(j+1)^{th}$ environmental image to the $N^{th}$ environmental image; and generate an offline map of the target road section according to the first world coordinate, the second world coordinate, and the third world coordinate.

16. The vehicle according to claim 15, wherein the processor is further configured to:

select a $k^{th}$ environmental image to a $(k+1)^{th}$ environmental image from the $i^{th}$ environmental image to the $j^{th}$ environmental image as an initial image pair, where k is a positive integer equal to or greater than i and equal to or less than j−1;

perform a three-dimensional modeling on the initial image pair to obtain initial first posture information of the camera and an initial first world coordinate corresponding to the first test point; and perform a first update on the initial first posture information and the initial first world coordinate sequentially according to the $(k-1)^{th}$ environmental image to the $i^{th}$ environmental image, and performing a second update on the initial first posture information and the initial first world coordinate sequentially according to a $(k+2)^{th}$ environmental image to the $j^{th}$ environmental image, to generate the first posture information and the first world coordinate corresponding to the first test point.

17. The vehicle according to claim 15, wherein the processor is further configured to:

perform a three-dimensional modeling on the $(i-1)^{th}$ environmental image based on the first posture information and the first world coordinate corresponding to the first test point, to obtain initial second posture information of the camera and an initial second world coordinate corresponding to the second test point; and perform a third update on the initial second posture information and the initial second world coordinate sequentially according to the $(i-2)^{th}$ environmental image to the first environmental image to generate the second posture information and the second world coordinate corresponding to the second test point.

18. The vehicle according to claim 15, wherein the processor is further configured to:

perform a three-dimensional modeling on the $(j+1)^{th}$ environmental image based on the first posture information and the first world coordinate corresponding to the first test point, to obtain initial third posture information of the camera and an initial third world coordinate corresponding to the third test point; and perform a fourth update on the initial third posture information and the initial third world coordinate sequentially according to the $(j+2)^{th}$ environmental image to the $N^{th}$ environmental image, to generate the third posture information and the third world coordinate corresponding to the third test point.

* * * * *